(12) United States Patent
Sood

(10) Patent No.: US 6,697,632 B1
(45) Date of Patent: Feb. 24, 2004

(54) MULTI-MEDIA COORDINATED DELIVERY SYSTEM AND METHOD

(75) Inventor: Prem Sood, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/074,574

(22) Filed: May 7, 1998

(51) Int. Cl.$^7$ .......................... H04B 7/005; H04B 7/01; H04B 7/015; H04B 15/00
(52) U.S. Cl. .................. 455/502; 455/503; 455/403; 455/422; 455/517; 455/560; 375/354; 375/355
(58) Field of Search ................. 455/502, 503, 455/403, 422, 560, 517, 416; 125/48; 348/14.02, 14.04; 375/354, 355, 356

(56) References Cited

U.S. PATENT DOCUMENTS

| | | | |
|---|---|---|---|
| 4,694,490 A | * 9/1987 | Harvey et al. | 380/234 |
| 5,333,299 A | * 7/1994 | Koval et al. | 395/550 |
| 5,345,551 A | 9/1994 | Shelley et al. | 395/157 |
| 5,392,223 A | * 2/1995 | Caci | 364/514 |
| 5,465,240 A | 11/1995 | Mankovitz | 369/1 |
| 5,517,253 A | 5/1996 | De Lange | 348/513 |
| 5,526,024 A | 6/1996 | Gaglianello et al. | 345/1 |
| 5,537,685 A | * 7/1996 | Matsuno | 455/51.1 |
| 5,553,222 A | 9/1996 | Milne et al. | 395/154 |
| 5,561,715 A | 10/1996 | Long | 381/14 |
| 5,583,980 A | 12/1996 | Anderson | 395/173 |
| 5,594,660 A | 1/1997 | Sung et al. | 364/514 |
| 5,630,017 A | 5/1997 | Gasper et al. | 395/2.85 |
| 5,694,455 A | * 12/1997 | Goodman | 379/59 |
| 5,751,694 A | * 5/1998 | Toft | 370/503 |
| 5,758,294 A | * 5/1998 | Ganesan et al. | 455/561 |
| 5,799,067 A | * 8/1998 | Kikinis et al. | 379/93.06 |
| 5,802,469 A | * 9/1998 | Nounin et al. | 455/422 |
| 5,812,951 A | * 9/1998 | Ganesan et al. | 455/445 |
| 5,818,825 A | * 10/1998 | Corrigan et al. | 370/329 |
| 5,875,396 A | * 2/1999 | Stocklon et al. | 455/562 |
| 6,052,594 A | * 4/2000 | Chuang et al. | 455/450 |

OTHER PUBLICATIONS

Document entitled, TIA/EIA/IS–95–A+TSB74, Mobile Station–Base Station Compatibility Standard for Dual–Mode Wideband Spread Spectrum Cellular System+Telecommunications Systems Bulletin: Support for 14.4 kops Data Rate and PCS Interaction for Wideband Spread Spectrum Cellular System, Feb. 27, 1996, pp 7–141 to 7–144.

* cited by examiner

*Primary Examiner*—Vivian Chin
*Assistant Examiner*—Marceau Milord
(74) *Attorney, Agent, or Firm*—David C. Ripma; Matthew D. Rabdau

(57) ABSTRACT

A method of coordinating the delivery of two independent messages, of different mediums, for simultaneous presentation is provided. The messages are communicated in a system capable of including coordination plans with the messages. The coordination plans include the identity of the independent messages, points in the messages where the coordination begins, and the duration of the presentation. Once linkage points in the first and second messages are defined, the relationship between messages is defined, so that independent messages 10 are displayed with predefined, meaningful timing. In communication system flexible enough to support real-time, two-way communications, such as wireless telephones, at least one of the messages to be coordinated can be received and presented in real-time. A system of coordinating two independent messages with a coordination plan message is also provided.

6 Claims, 3 Drawing Sheets

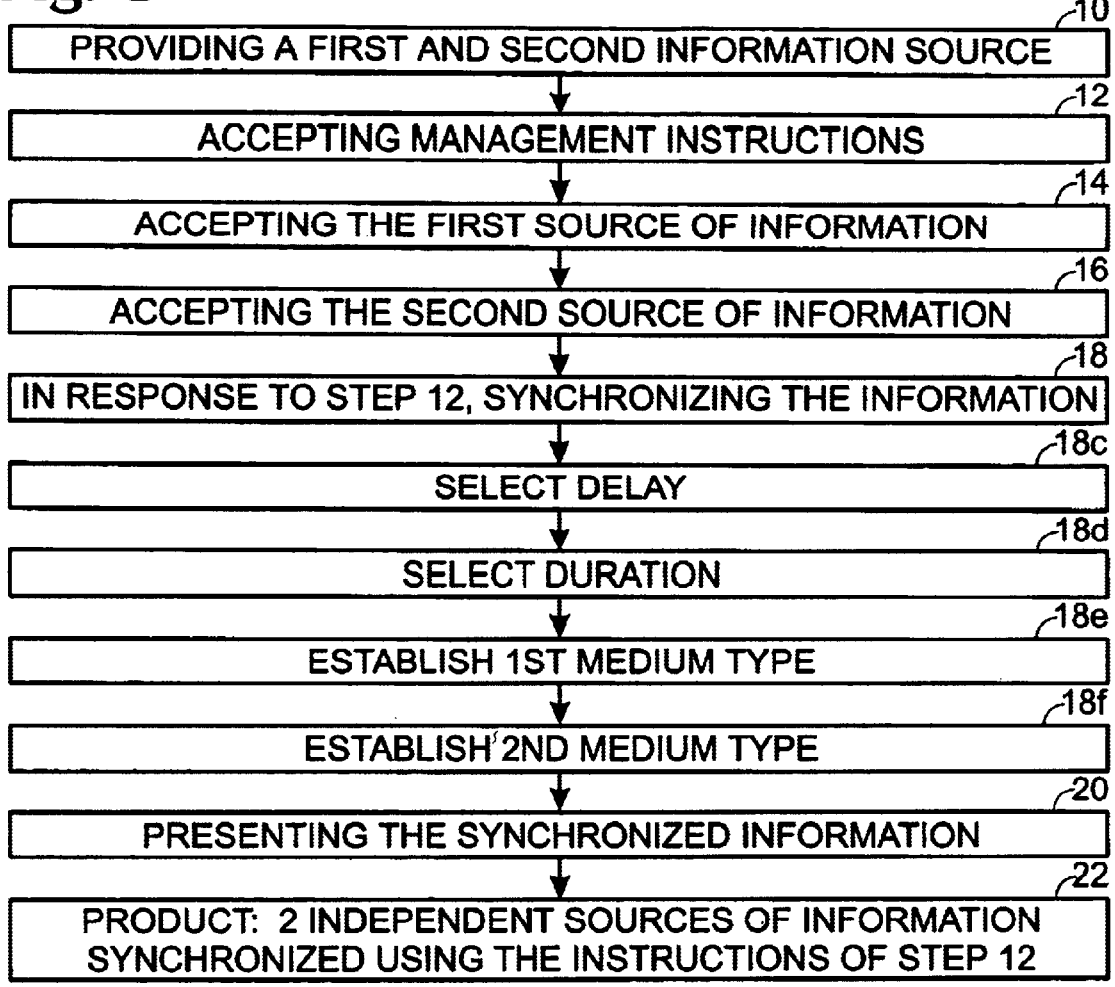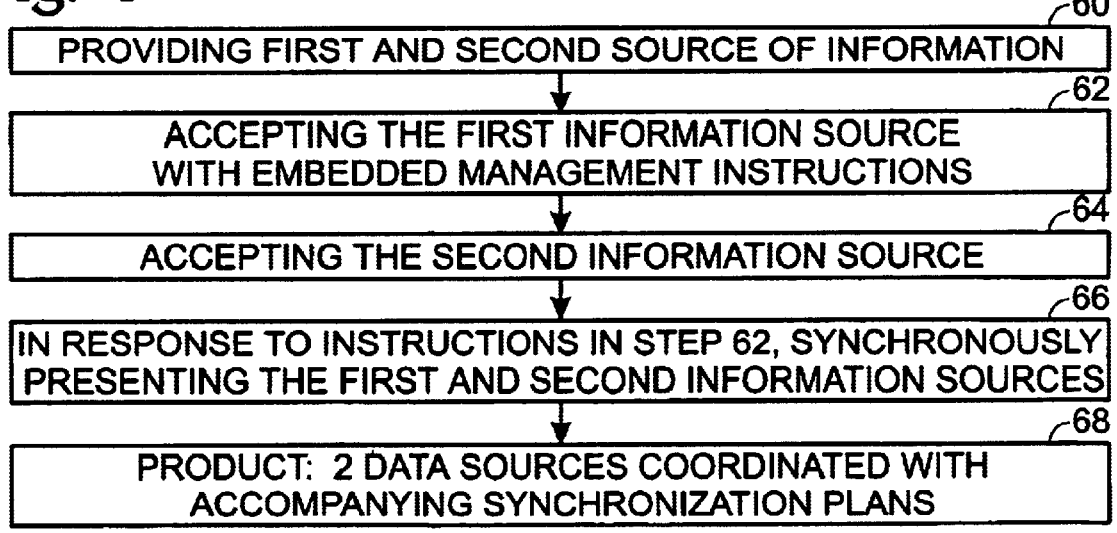

Fig. 2

CHANNEL ASSIGNMENT MESSAGE

| FIELD | LENGTH (BITS) |
|---|---|
| MSG-TYPE ("00001000") | 8 |
| ONE OR MORE OCCURRENCES OF THE FOLLOWING RECORD: | |
| ACK_SEQ | 3 |
| MSG_SEQ | 3 |
| ACK_REQ | 1 |
| VALID_ACK | 1 |
| ADDR_TYPE | 3 |
| ADDR_LEN | 4 |
| ADDRESS | 8 X ADDR_LEN |
| ASSIGN_MODE | 3 |
| ADD_RECORD_LEN | 3 |
| ADDITIONAL RECORD FIELDS | 8 X ADD_RECORD_LEN |
| RESERVED | 0-7 AS NEEDED |

Fig. 3

| ELEMENT NAME | LENGTH (OCTETS) |
|---|---|
| COORD_TO_STREAM S1 | 0 (BEING SHOWN HERE ONLY FOR REFERENCE) |
| S1_MEDIUM_ID | 1/2 |
| S1_MESSAGE_ID | 1 |
| COORDINATION_STRIP_S2 | 0 (BEING SHOWN HERE ONLY FOR REFERENCE) |
| S2_MEDIUM_ID | 1/2 |
| S2_MESSAGE_ID | 1 |
| S2_LENGTH | 1 |
| S2_RUN_LENGTH | 1 |
| COORD_PT_ID_IN_S1 | 1/2 |
| START_OF_PLAY_DELAY | 1 |
| RESERVED | 1/2 |

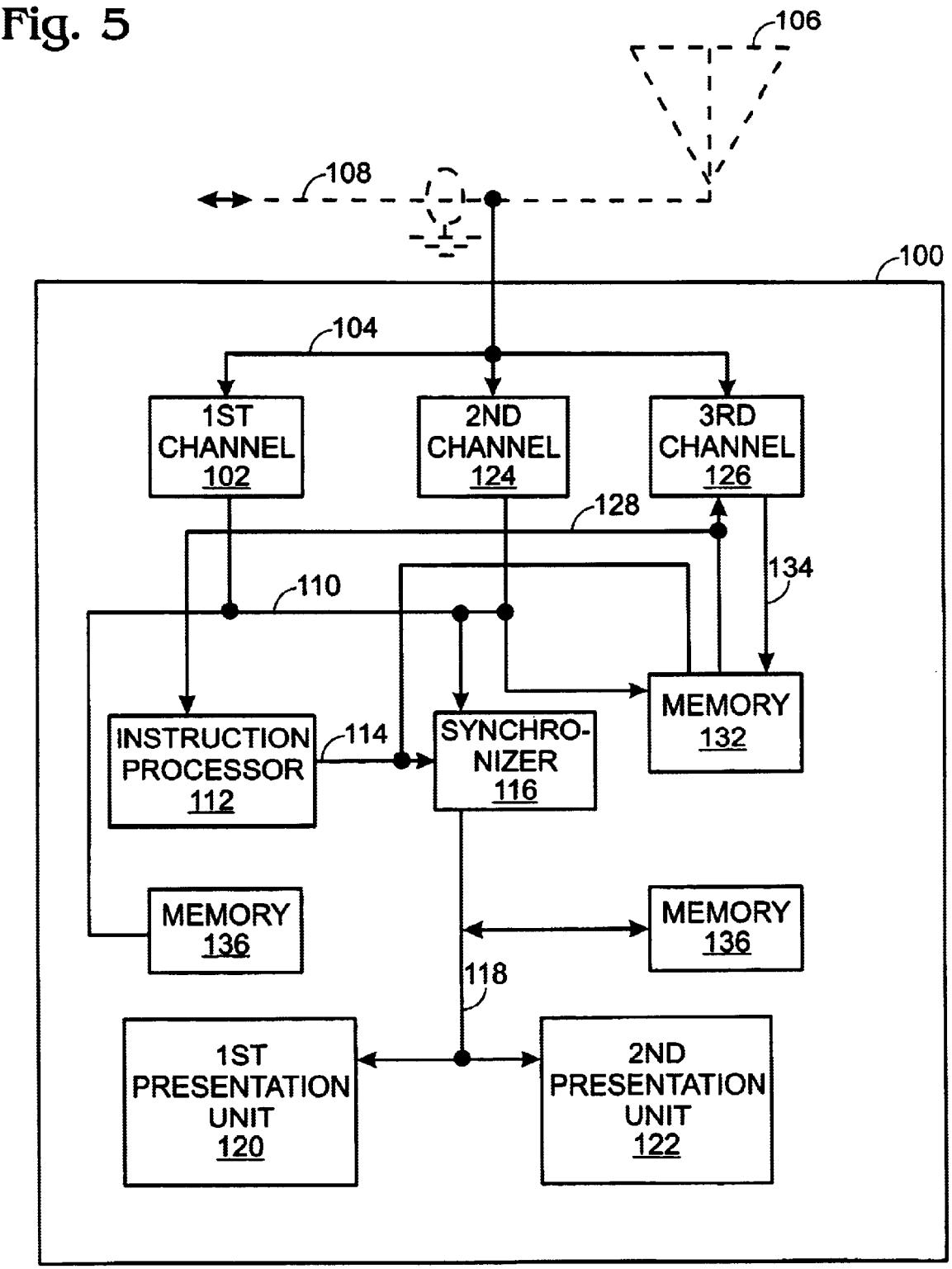

MULTI-MEDIA COORDINATED DELIVERY SYSTEM AND METHOD

BACKGROUND AND SUMMARY OF THE INVENTION

This invention relates generally to communications and, more particularly, to a system and method of synchronizing a multi-media message communication.

A system is typically considered to have multi-media capabilities if it can simultaneously present different types of information mediums. Specialized computer applications have been developed for some systems to permit a user to integrate independent streams of information. Shelley et al., U.S. Pat. No. 5,345,551 disclose a system permitting a computer operator to manually synchronize information streams. Koval et al., U.S. Pat. No. 5,333,299 disclose a software program, stored in computer memory, capable of embedding synchronization signals into master and slave information streams. Neither system permits real-time synchronization of the independent data streams. The multiple information mediums must undergo a separate process of synchronization before the information is presented in the synchronized form. Further, neither system operates flexibly enough to support the convenient transfer of two-way messages between people.

Current mobile and land-line communication systems allow voice, data, and sometimes video information to be communicated in real-time, or near real-time. However these systems do not support the delivery of multi-media information streams, as only one type of information medium is communicated. That is, current communication systems do not simultaneously communicate multiple information mediums. Further, these system do not provide a means of synchronizing a second medium of information with a communicated medium of information.

It would be advantageous if multiple information mediums could be delivered in a format ready for presentation.

It would be advantageous if multiple information mediums could be delivered with synchronization instructions.

It would be advantageous if information coding, delivery system, and synchronization instructions could be embedded in a standard communication system, such as a telephone, or a network-linked computer.

It would be advantageous if at least one stream of information could be received, synchronized, and presented with a second stream of information in real-time. It would also be advantageous if the two streams of information could be of different medium types.

Accordingly, a method for presenting information from a first source, synchronously, with at least a second source of information is provided. The method comprises the steps of:

a) accepting instructions to control the acceptance and management of the first and second information sources;

b) accepting the first source of information;

c) accepting the second source of information;

d) in response to instructions accepted in Step a), synchronizing the information of the second source with information of the first source; and e) presenting the synchronized information of both the first and second sources.

The information streams and management instructions are communicated in a variety of ways. For example, three distinct physical channels, or time multiplexed data groupings may be provided. In a TDMA system these channels may be different slots, and the function of the slots may be adaptive, changing in response to internal, or base directed software commands. In a CDMA system the three channels may be different orthogonal spreading codes. The three channels permit Steps a)–c) to include accepting the management instructions, and the first and second sources of information.

Step d) includes selecting a bit, or some other conveniently identified part of the first source of information as a coordination point which is synchronized to the starting bit of information in the second source. Then, Step e) includes presenting the starting bit in the second source in response to presenting the coordination point in the first source. That is, a point in the first source is chosen as a reference for synchronization.

To fine-tune the synchronization of the information streams a further step, following Step d), selects a delay to define the time duration between the coordination point in the first source and the starting bit in the second source. Then, Step e), delays the presentation of the starting bit in the second source from the presentation of the coordination point in the first source. Likewise, a time duration is selected for the presentation of the second source of information, and Step e) includes presenting the second source of information for the selected time duration.

Typically, the first source of information is a first communication medium type, and the second source is a different communication medium type. The management instructions are used to establish the first and second source medium types. The medium types are presented in Step e) in response to the communication medium types established. In this manner, the synchronization method is able to integrate different types of communication medium. Typically, the first and second communication medium types are selected from the group consisting of audio, audio/video, video, text, images, and data. For example, Step d) may include synchronizing the audio information of the second source with the audio/video information of the first source, so that a voice is dubbed over an audio/visual presentation.

Specifically, the management instructions may include a field devoted strictly to synchronization. This so-called Inter-Medium Coordination Management Field defines the synchronization of the first and second sources of information, with a series of sub-fields to define the medium types of each source, the identity of each source, the number of bits in the second source, the presentation length of the second source, the coordination point in the first source, and the delay between the coordination point and the beginning the second source presentation.

The method of the present invention is not necessarily limited to synchronizing two streams of information. In one aspect of the invention a Step $c_1$) accepts a third source of information and Step a) includes accepting management instructions to control the acceptance of the third source. Then, Step d) includes synchronizing the information in the third source with information in the first source, and Step e) includes presenting the synchronized information of the first, second, and third sources.

The present invention is useful in almost any communication system including, but not limited to, wireless systems such as those of the IS-95, W-CDMA, IS-136, and GSM standards.

A receiver has also been provided to synchronize at least two independent streams of information for real-time presentation. The receiver comprises at least a first communication channel having an input to accept at least a first stream of modulated information. The channel downconverts, demodulates, and decodes the information part of the received signal. The information is either received with embedded management instructions, or the instructions and information are received on separate channels. An instruction processor accepts management instructions. The instruction processor creates information stream management commands in response to the instructions.

A synchronizer, having a first input connected to the first communication channel output, accepts information streams. A second input connected to the instruction processor output accepts management commands. The synchronizer synchronizes the first and second information streams in real-time as the first information stream is accepted by the first communication channel. At least a first information presentation unit, having an input connected to the synchronizer output, presents the first stream of information simultaneously with the acceptance of the first stream of information by the first receiver channel. In this manner, two streams of information are synchronized for real-time presentation. A second presentation unit, having an input connected to the synchronizer output, presents the second medium type, when the two information streams are different medium types.

BRIEF DESCRIPTION OF THE DRAWINGS

FIG. 1 is a flow chart illustrating a method for synchronously presenting information.

FIG. 2 is a example of management instructions organized in accordance with IS-95 standards (prior art).

FIG. 3 is an example of the synchronization field, called the Inter-Medium Coordination Field, part of the Channel Assignment Message, organized in accordance with IS-95 standards.

FIG. 4 is a flow chart illustrating another aspect of the method for presenting information synchronously.

FIG. 5 is a schematic representation of a receiver which synchronizes at least two independent streams of information for realtime presentation.

DETAILED DESCRIPTION OF THE PREFERRED EMBODIMENT

FIG. 1 is a flow chart illustrating a method for synchronously presenting information. The present invention is useful in multi-media, e-mail, and wireless communications. Step 10 provides a wireless communication systems including at least one base station, the present method permits a mobile station to synchronize the presentation of a first communication stream to the presentation of at least a second communication stream. In some aspects of the invention, the first and second sources of information are provided by base station, e-mail sender, and memory. The wireless communication system is selected from the group consisting of IS-95, W-CDMA, IS-136, and GSM.

In an e-mail system, for example, a realtor may send a pre-existing video (with sound) clip of a listed house as one source of information. The realtor may choose to dub their voice over parts of the video to point out special features of interest to a specific client. The two independent mediums are sent to the client with the synchronization instructions. When the client opens their e-mail, the synchronization instructions automatically present the video and voice dubbing with the timing arranged by the sender (realtor).

In a wireless system, a client (receiver) has their telephone attached to auxiliary presentation equipment, such as a video monitor. As above, a video of a house is sent as one piece of data, and the realtor (sender) sends a voice commenting on features in the video. Technically, it is challenging to send both pieces of information and the synchronization instructions in real-time, so that the client sees the presentation of information at approximately the same time that it is sent. The sender may send the video at an earlier time, or access a video record stored in the memory of the client's receiver. Then, the sender can trigger the presentation of the previously sent video, and make comments on the video, creating synchronization commands.

Step 12 accepts instructions to control the acceptance and management of the first and second information sources. In a wireless system management fields of instructions are received to control the reception of the first and second communication streams. The management instructions are grouped into octets, fields, packets, or messages depending on the specific communication system. Hereafter, the term "management instructions" is intended to include any such possible grouping of data. Step 14 accepts the first source of information. In a wireless system, the first communication stream of information is received. Hereafter it is understood that the terms "communication streams" and "sources" are substantially interchangeable. Likewise, Step 16 accepts the second source of information. In a wireless system, the second communications stream of information is received. The order of steps 12, 14, and 16 are somewhat arbitrary. In some aspects of the invention, the information is received before the management instructions. In other aspects, the information is received after the instructions. Further, the information and instruction segments are received in cycles or in changing order in response to the nature of the information or management considerations in the communication system.

Step 18, in response to instructions accepted in Step 12, synchronizes the information of the second source with information of the first source. Step 20 presents the synchronized information of both the first and second sources. Alternately, Steps 18 and 20 are considered to be combined so that the second communication stream of information is synchronously presented with the first communication stream of information in response to the instructions received in Step 12. Step 22 is a product, where two independent information sources are synchronized, or two independent communication streams, or data sources are joined, or coordinated with the use of the accompanying coordination plans in Step 12.

In one aspect of the invention, a memory device is provided in Step 10 to store information and management instructions. Then, further steps (not shown), following Step 18, occur. Step 18a stores the synchronized information of the first and second sources in memory, and Step 18b accesses the information stored in Step 18a. In this manner, the information of the first and second sources is synchronously presented after being stored. Alternately, the memory device stores information and management instructions. Then, further steps (not shown) preceding Step 18 occur. Step 16a stores, in memory, the information of the first and second sources accepted in Steps 14 and 16, respectively, and the management instructions accepted in Step 12. Step 16b accesses the information and management instructions stored in Step 16a. In this manner, the information of the first and second sources is stored before processing into synchronously linked data sources.

In one aspect of the invention at least three communication channels are provided in Step 10. The definition of communication channel, as used herein, is very broad. In one aspect of the invention, the channels are distinct physical channels, such as different carrier frequency bands. Alternately, the channels are a single carrier that is time multiplexed. Further, the channels may be different time slots of a single physical channel. In a CDMA system the channels are data sent on a single carrier, at the same time, with different orthogonal spreading codes. In some aspects of the invention, the definition of the channels is adaptive, as the use and characteristics of time multiplexed slots change in response to broadcast commands, or receiver logic. The channels are also combinations of physical, time, frequency, and orthogonally coded messages. In some aspects of the invention, the channels are also specified as higher layers of a layered hierarchical protocol structure such as Open System Interconnection (OSI) and Integrated Services Digital Network (ISDN) and are implemented in Software/firmware only to implement the time sharing of a physical channel. However defined, all three, or any combination of the information streams and management instructions are carried on one, two, or three channels. Steps 12–16 include accepting the management instructions, and the first and second sources of information on the three communication channels, however the channels have been defined.

Typically, the communications are digitally formatted, although the present invention's method also applies to analog formats. Whether the communication is organized in octets, packets, fields, messages or other groupings, the ultimate basis of information transfer is usually the bit. Given the nature of modern communications, even the analog Advanced Mobile Phone Service (AMPS) wireless system uses receiver equipment which digitizes data at some point in the receiving process. Step 18 includes selecting a bit in the first source of information as a coordination point synchronized to the starting point of information in the second source. For example, the coordination point could be the rising edge of the first bit in a specified field. Step 20 includes presenting the starting point in the second source in response to presenting the is coordination point in the first source. It is assumed for the purposes of this discussion that the location of the starting point in the second stream is a predetermined bit location, in accordance with a format known to all the communication players in the system. For example, the starting point is the first bit of the information to be presented in the second stream strip. Alternately, the starting point is a bit in the second stream of bits preceding, or subsequent to the actual bits of information to be presented. In some aspects of the invention, the starting point is defined by the management instructions in the same manner that the coordination point is defined. Regardless of the exact location of the coordination point in the first stream and the starting point in the second stream, once references are taken in the two streams, it becomes possible to synchronize the streams.

Generally, the information streams and the management instructions are communicated in a serial order, so that a first bit precedes a second bit in time. However the method of the present invention applies equally well to parallel data transfer systems where a number of bits arrive simultaneously. Even in parallel processing systems, groupings of data are handled in a serial sequence. Steps 14 and 16 include accepting, respectively, first and second sources of information in a sequentially order, and Step 12 includes accepting sequentially ordered fields as the management instructions. Then, Step 18 includes selecting a coordination point in a sequence of bits in the first source.

The method includes further steps, following Step 18. Step 18c, in response to instructions from the management fields accepted in Step 12, selects a delay which defines the time duration between the coordination point in the first source and the starting point, or bit in the second source. Step 20, in response to the time duration selected in Step 18c, includes delaying the presentation of the starting point in the second source from the presentation of the coordination point in the first source. The synchronized presentations are finely adjusted with a delay, after coarse adjustment with the coordination point.

Step 18d, in response to instructions from the management fields accepted in Step 12, selects a duration for the presentation of the second source of information. Then, Step 20 includes presenting the second source of information for the time duration selected in Step 18d. Once the starting point, delay, and duration are known, the synchronization of the second information stream to the first information stream is completely described.

In some aspects of the invention, the first source provided in steps 10 is a first predetermined communication medium type and the second source is a second predetermined communication medium type. Further steps, then, follow Step 16. Step 18e establishes the first source first communication medium type in response to accepting the management fields in Step 12. Step 18f establishes the second source second communication medium type in response to accepting the management fields in Step 12. Then, Step 20 includes presenting information fields of the first source in response to the communication medium type established in Step 18e, and also includes presenting information fields of the second source in response to the communication medium type established in Step 18f. In this manner, the synchronization method is able to integrate different types of communication medium.

The first and second communication medium types provided in Step 10 are selected from the group consisting of audio, audio/video, video, images, text, and data. The method includes broadcast quality audio as well as compression schemes such as a variety of vocoders, Adaptive Delta Modulation (ADPCM), and $\mu$-law PCM, as are well known in the art. The audio/video medium includes full motion, slow motion, and slow scan video. Data medium includes images, animation, text, moving images, graphs, and abstract pictures. In some aspects of the invention, Step 10 provides a receiver, audio/video information as the first medium type, and audio information as the second medium type. Steps 12–16 include accepting the management fields and first and second source information fields, respectively, with the receiver. For example, when Step 10 provides a audio/video first medium type and an audio second medium type, Step 18 includes synchronizing the audio information of the second source with the audio/video information of the first source. In this manner, a voice is dubbed over an audio/visual presentation.

Step 10 provides for a plurality of information streams, with each source having a unique message identification number. For example, each information stream is given an identification number in an octet of data before, or after the information. In some aspects of the invention the information is also supplied with the management instructions. The identification number is supplied with the management channel, and the correlation between each information stream and identification number is made through timing relationships. Then, Step 12 includes accepting a first source message identification number and a second source message identification number in the management fields. Step 14 includes selecting the source with the first source message identification number, and Step 16 includes selecting the source with the second source message identification number.

FIG. 2 is a example of management instructions organized in accordance with IS-95 standards (prior art). Although the IS-95 is specifically described, the method applies equally well any communication system, especially one which communication system data and management instructions. The functions of the pre-existing field names and assignment values in the Channel Assignment Message are defined in section 7.7.2.3.2.8 of IS-95, Revision B. The pre-existing values of ASSIGN_MODE are "000" to "101", representing a traffic channel assignment, paging channel assignment, acquire analog system assignment, analog voice channel assignment, extended traffic channel assignment, extended paging channel assignment. To implement a new field to control synchronization, a new ASSIGN_MODE with a value greater than "101" is created, such as "110" to define the synchronization field and function.

FIG. 3 is an example of the synchronization field, called the Inter-Medium Coordination Field, part of the Channel Assignment Message, organized in accordance with IS-95 standards. Returning to FIG. 1, Step 12, in response to receiving the management fields, identifies an Inter-Medium Coordination Field in a message, such as the Channel Assignment Message. In this manner, synchronization is conducted in the context of established communication management protocols. Step 12 includes accepting an Inter-Medium Coordination Management Field to define the synchronization of the first and second sources of information. These sub-fields, or sub-steps (not shown) identify the first and second information streams, the coordination point, the duration, and the medium types (also see FIG. 3).

Step 12a accepts a first sub-field (S1_MEDIUM_ID) to define the first source first medium type. In the IS-95 example of FIG. 3, the S1_MEDIUM_ID field is ½ of an octet in length. Step 12b accepts a second (S1_MESSAGE_ID) sub-field to define the first source message identification number, whereby a specific sequence of information is identified as the first source in Step 14. In the IS-95 example, S1_MESSAGE_ID has a length of 1 octet to identify the first communication stream. Step 12c accepts a third sub-field to define the second source second medium type. In the IS-95 example, S2_MEDIUM_ID is a field of ½ an octet to identify the second communication stream medium type.

Step 12d accepts a fourth sub-field to define the second source message identification number, whereby a specific sequence of information is identified as the second source. In the IS-95 example, S2_MESSAGE_ID is a field of 1 octet to identify the second communication stream in Step 16. Step 12e accepts a fifth sub-field to define the size of the second source information stream. Typically, the number of bits or octets in the second source of information, whereby the amount of information in the second source is defined. In the IS-95 example, a S2_LENGTH field has a length of 1 octet identifies the number of octets in the second communications stream.

Step 12f accepts a sixth sub-field to define the presentation duration of the second source. In the IS-95 example, S2_RUN_LENGTH field has a length of 1 octet to identify the presentation time duration of the second communications stream. Step 12g accepts a seventh sub-field to define the coordination point in the first source of information from which the synchronization of the second source is referenced. In the IS-95 example, COORD_PT_ID_IN_S1 is a field of ½ an octet to identify a reference point in the first communications stream to synchronize the second communication stream with the first information stream.

Step 12h accepts an eighth sub-field to define the delay between the coordination point established in sub-field 12g and the start of the presentation of the second source information stream. In the IS-95 example, START_OF_PLAY_DELAY is a field of 1 octet to identify a time delay, from the presentation of the coordination point until the presentation of the first information stream with the second communications stream.

In some aspects of the invention three, or more information streams are synchronized. A further step, precedes Step 18. Step 16c (not shown) accepts a third source of information, and Step 12 includes accepting management instructions to control the acceptance of the third source. Then, Step 18 includes synchronizing the information in the third source with information in the first source, and Step 20 includes presenting the synchronized information of the first, second, and third sources. Alternately, Step 18 includes synchronizing the information in the third source with information in the second source, and Step 20 includes presenting the synchronized information of the first, second, and third sources.

In some aspects of the invention, only one information stream is communicated. That is, the user already has the second information stream on hand, or in memory. A first information stream is communicated and synchronized with the information stream already on hand. A memory device is provided in Step 10 for the storage of sources of information, and Step 16 includes accepting the second source from memory. For example, a sender chooses an image residing in memory with the receiver for a visual background to an audio message.

In one aspect of the invention, at least one information stream is received and presented in real-time. Alternately, at least one information stream is received in real-time, but the user is presented the synchronized information at a later time. For example, when the user checks their e-mail. In another aspect of the method, the information streams and instructions are stored by the sender. The information streams and instructions are sent, synchronized, and presented to the user at the user's command. Once again, a user checking e-mail is an appropriate example. In such as system, a further step, preceding Step 12, is required. Step 10a signals the base station to transmit communications including information sources and management instructions, whereby the information streams and management instructions are stored at the base station, and retrieved by the mobile station in real-time.

FIG. 4 is a flow chart illustrating another aspect of the method for presenting information synchronously. Step 60 provides a first source of information and at least a second source of information. Step 62 accepts the first source of information with embedded management information instructions. Step 64 accepts the second source of information. Step 66, in response to instructions accepted in Step 62, synchronizes the information of the second source with information of the first source. Step 68 is a product, where two independent data sources are coordinated with accompanying synchronization plans.

FIG. 5 is a schematic representation of a receiver 100 to synchronize at least two independent streams of information for real-time presentation. Receiver 100 comprises at least a first communication channel 102 having an input on line 104 to accept at least a first stream of coded information. Line 104 is operatively connected to antenna 106 in wireless communication embodiments of the invention. Alternately, line 104 is operatively connected to a physical line 108 such as coaxial line, or fiber optic cable for computer/e-mail embodiments. First channel 102 represents a wireless receiver circuitry or any other circuitry which receives modulated carrier signals, coded digital signals, or organized data for processing. Hereafter, first channel 102 will be said to decode information. First channel 102 has an output on line 110 to provide decoded information streams.

An instruction processor 112, having an input on line 110, accepts management instructions. Instruction processor 112 creates information stream management commands in response to the instructions, and has an output on line 114 to provide management commands.

A synchronizer 116, having a first input operatively connected on line 110 to first communication channel 102 output, accepts information streams. A second input operatively connected to instruction processor 112 output on line 114 accepts management commands. Synchronizer 116 synchronizing the first and second information streams as the first information stream is accepted, or received by first communication channel 102, in response to management commands, and provides the synchronized information streams at an output on line 118.

At least a first information presentation unit 120, having an input operatively connected to said synchronizer output on line 118, presents the first stream of information simultaneously with the acceptance of the first stream of information by first receiver channel 102. In this manner, two streams of information are synchronized for real-time presentation. As is well known in the art, even in real-time communication systems, information is not presented at exactly the same time that it is received, as there is some processing delay. However, the presentation is substantially simultaneous, and appears to be exact realtime to the user.

Typically, the first stream of information is a first medium type and the second stream of information is a second medium type. First presentation unit 120 presents at least the first medium type. Receiver 100 further comprises a second presentation unit 122 having an input operatively connected to synchronizer 116 output on line 118 to present presentation unit 120 presents at least the first medium type. Receiver 100 further comprises a second presentation unit 122 having an input operatively connected to synchronizer 116 output on line 118 to present the second medium type. In this manner, the first and second streams of information are synchronously presented.

In one aspect of the invention, the first and second information streams, and the management instructions are all accepted on first 102, second 124, and third 126 communication channels, respectively. As described above in the description of FIG. 1, the definition of the word channel is intended to be broad, to cover CDMA orthogonal coding, time multiplexing, as well as any construction and categorization of data by receiver 100, and the communication system being used, in software. For convenience and clarity, first 102, second 124, and third 126 channels are depicted in FIG. 5 as physical channels. The output of first 102 and second 124 communication channels are operatively connected to synthesizer 116 input to provide decoded information. Third channel 126 output is operatively connected to instruction processor 112 input on line 128 to provide decoded management instructions.

Synchronizer 116 selects a point in the first stream of information as a coordination point, to reference the start of the presentation of the second stream of information with the first stream of information, in response to information stream management commands received on line 114. In this manner, a point in the first stream is chosen as a reference for synchronization.

Synchronizer 116 selects, in response to management commands on line 114, a delay which defines the time from the coordination point in the first stream of information to the start of the synchronized presentation of the second stream of information. Further, synchronizer 116 selects, in response to management commands on line 114, a duration for the presentation of the second stream of information.

As demonstrated above in the discussion of FIGS. 1–3, the streams of information and management instructions are organized sequentially, and the management instructions include an Inter-Medium Coordination Field sub-fields as follows:

a first sub-field to define the first information stream medium type;

a second sub-field to define the first information stream message identification number, whereby a specific stream of information is identified as the first stream;

a third sub-field to define the second information stream medium type;

a fourth sub-field to define the second information stream message identification number, whereby a specific stream of information is identified as the second stream;

a fifth sub-field to define the size the second information stream, whereby the amount of information in the second stream is defined;

a sixth sub-field to define the presentation duration of the second information stream;

a seventh sub-field to define the coordination point in the first stream of information from which the synchronization of the second stream of information is referenced;

an eighth sub-field to define the delay between the coordination point established in the seventh sub-field and the start of the presentation of the second stream of information.

In some aspects of the invention, receiver 100 further comprises a first memory device 130 having an input operatively connected to synchronizer 116 output on line 118. First memory device 130 stores the synchronized information streams. First memory 130 has an output operatively connected to the input of first presentation device 120 on line 118, whereby the information of the first and second streams is synchronously presented after being stored. Alternately, a second memory device 132 having an input operatively connected to at least first communication channel 102 output on line 110. In some aspects of the invention, line 110 operatively connects the outputs of second channel 124 to an input of memory 132 on line 110, as shown in FIG. 5. FIG. 5 also shows an output of third channel 126 operatively connected to an input of memory 132 on a line 134. Second memory device 132 stores the first and second information streams and management instructions. Second memory device 132 has outputs operatively connected to the inputs of synchronizer 116 on line 114 and said instruction processor 112 on line 128, whereby the information of the first and second streams is synchronized and presented after being stored.

The first and second medium types are selected from the group consisting of audio, audio/video, video, text, image, and data. For example, the first medium type is audio/video information and the second medium type is audio information. Then, first presentation unit 120 is a video monitor, with speaker, to present audio information from the second stream synchronized with audio/visual information from the first stream. Alternately, the second stream on audio information is presented on a separate speaker, on second presentation unit 122.

In some aspects of the invention, receiver 100 synchronizes information from a third stream of information (a fourth physical channel is not shown). Then, instruction processor 112 creates commands to manage the third stream of information, and synchronizer 116 synchronizes the third stream of information with the first and second streams in response to the management commands on line 114.

In some aspects of the invention, receiver 100 further comprising an information storage unit, or third memory 136 having an output on line 110 to provide the second stream of information, whereby information in memory is synchronized with real-time information.

A system and method of coordinating independent messages of different medium styles is provided. The messages are delivered in a communication format that permits. the inclusion of the coordination plan with the independent messages. At least one real-time message is coordinated using the embedded plan, which makes the invention applicable to wireless communications. Alternately, messages are prepared for subsequent coordination and presentation to a user, which makes the invention applicable to e-mail applications. Other variations and embodiments will occur to those skilled in the art.

What is claimed is:

1. In a wireless communication system including at least one base station, a method for a mobile station to synchronize the presentation of a first communication stream to the presentation of at least a second communication stream, the method comprising the steps of:
   a) receiving the first communication stream of information;
   b) receiving the second communications stream of information;
   c) receiving management fields of instructions to control to reception of the first and second communication streams; and
   d) in response to the instructions received in Step c), synchronously presenting the second communication stream of information with the first communication stream of information, whereby two independent communication streams are joined with the use of accompanying coordination plans.

2. A method as in claim 1 in which Step c) includes, in response to receiving the management fields, identifying an Inter-Medium Coordination Field in a message, whereby the synchronization is conducted in the context of established communication management protocols.

3. A method as in claim 2 wherein a plurality of communication streams are received, with each stream having a unique message identification number, and in which Step c) includes identifying the Inter-Medium Coordination sub-fields as follows:
   i) receiving a S1_MEDIUM_ID field to identify the first communication stream medium type;
   ii) receiving a S1_MESSAGE_ID field to identify the first communication stream in Step a);
   iii) receiving a S2_MEDIUM_ID field to identify the second communication stream medium type;
   iv) receiving a S2_MESSAGE_ID field to identify the second communication stream in Step b);
   v) receiving a S2_LENGTH field to identify the number of octets in the second communications stream;
   vi) receiving a S2_RUN_LENGTH field to identify the presentation time duration of the second communications stream;
   vii) receiving a COORD_PT_ID_IN_S1 field to identify a reference point in the first communications stream to synchronize the second communication stream with the first information stream; and
   viii) receiving a START_OF_PLAY_DELAY field to identify a time delay, from the presentation of the coordination point identified in Sub-step vii) until the presentation of the first information stream with the second communications stream.

4. A method as in claim 3 in which the communication system is an IS-95 system, and in which the Inter-Medium Coordination sub-fields are received as follows:
   i) receiving a S1_MEDIUM_ID field of ½ an octet;
   ii) receiving a S1_MESSAGE_ID field of 1;
   iii) receiving an S2_MEDIUM_ID field of ½ an octet;
   iv) receiving an S2_MESSAGE_ID field of 1 octet;
   v) receiving an S2_LENGTH field of 1 octet;
   vi) receiving an S2_RUN_LENGTH field of 1 octet;
   vii) receiving a COORD_PT_ID_IN_S1 field of ½ an octet; and
   viii) receiving a START_OF_PLAY_DELAY field of 1 octet.

5. A method as in claim 1 wherein a receiver is provided with at least three channels to receive information of the first and second communication streams, and management fields, in which Steps a), b), and c) include receiving information on the three channels.

6. A method as in claim 1 wherein the communication system is selected from the group consisting of IS-95, W-CDMA, IS-136, and GSM.

* * * * *